(12) United States Patent
Imai et al.

(10) Patent No.: US 12,076,943 B2
(45) Date of Patent: Sep. 3, 2024

(54) FIBER-REINFORCED COMPOSITE MATERIAL AND SANDWICH STRUCTURE

(71) Applicant: Toray Industries, Inc., Tokyo (JP)

(72) Inventors: Naokichi Imai, Ehime (JP); Kotaro Shinohara, Ehime (JP); Masato Honma, Ehime (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 17/778,073

(22) PCT Filed: Nov. 16, 2020

(86) PCT No.: PCT/JP2020/042587
§ 371 (c)(1),
(2) Date: May 19, 2022

(87) PCT Pub. No.: WO2021/106650
PCT Pub. Date: Jun. 3, 2021

(65) Prior Publication Data
US 2022/0410502 A1 Dec. 29, 2022

(30) Foreign Application Priority Data
Nov. 29, 2019 (JP) .................. 2019-216112

(51) Int. Cl.
*B29C 70/14* (2006.01)
*B29C 53/24* (2006.01)
(Continued)

(52) U.S. Cl.
CPC .............. *B29C 70/14* (2013.01); *B29C 53/24* (2013.01); *B29C 66/721* (2013.01); *B29C 70/40* (2013.01);
(Continued)

(58) Field of Classification Search
CPC ................ B32B 3/28; B32B 2260/046; B32B 2305/026; B32B 2305/076;
(Continued)

(56) References Cited

U.S. PATENT DOCUMENTS

| 5,714,226 A | * | 2/1998 | Disselbeck | ........... | B29C 51/002 428/116 |
| 5,721,031 A | * | 2/1998 | Echigo | ................. | B01D 39/163 264/257 |

(Continued)

FOREIGN PATENT DOCUMENTS

| CN | 108495703 A | 9/2018 |
| JP | 5743833 A | 3/1982 |

(Continued)

OTHER PUBLICATIONS

"What is a Trapezoid?", May 4, 2016, Illustrative Mathematics, https://tasks.illustrativemathematics.org/content-standards/tasks/1504 (Year: 2016).*

(Continued)

*Primary Examiner* — Jasper Saberi
(74) *Attorney, Agent, or Firm* — Buchanan Ingersoll & Rooney PC

(57) ABSTRACT

An object of the present invention is to obtain a fiber-reinforced composite material achieving both lightweight properties and mechanical properties at a high level. The present invention is a fiber-reinforced composite material including: a resin (A); and a reinforcing fiber (B), and including: a fiber-reinforced structure portion including an in-plane orientation portion having an average fiber orientation angle of the reinforcing fiber (B) of 0° or more and 45° or less and an out-of-plane orientation portion having an average fiber orientation angle of the reinforcing fiber (B) of more than 45° and 90° or less; and a cavity portion defined by the in-plane orientation portion and the out-of-plane orientation portion of the fiber-reinforced structure portion.

20 Claims, 6 Drawing Sheets

(51) Int. Cl.
   *B29C 65/00* (2006.01)
   *B29C 70/40* (2006.01)
   *B29D 99/00* (2010.01)
   *B32B 3/28* (2006.01)
   *B29K 105/00* (2006.01)
   *B29K 307/04* (2006.01)
   *B29L 7/00* (2006.01)

(52) U.S. Cl.
   CPC ............ *B29D 99/0089* (2013.01); *B32B 3/28* (2013.01); *B29K 2105/256* (2013.01); *B29K 2307/04* (2013.01); *B29K 2995/0096* (2013.01); *B29L 2007/002* (2013.01); *B32B 2250/20* (2013.01); *B32B 2260/021* (2013.01); *B32B 2260/046* (2013.01); *B32B 2305/026* (2013.01); *B32B 2305/076* (2013.01)

(58) Field of Classification Search
   CPC . B32B 2260/021; B32B 3/30; B32B 2250/40; B29D 99/0089; B29C 70/14; B29C 53/24
   See application file for complete search history.

(56) References Cited

U.S. PATENT DOCUMENTS

| | | | |
|---|---|---|---|
| 2010/0048078 | A1 | 2/2010 | Kehrle et al. |
| 2010/0233424 | A1* | 9/2010 | Dan-Jumbo ............ B32B 27/38 428/113 |
| 2011/0281080 | A1 | 11/2011 | Levit et al. |
| 2014/0265043 | A1* | 9/2014 | Oldroyd ............. B29D 99/0089 425/162 |
| 2015/0266260 | A1 | 9/2015 | Fujioka et al. |
| 2016/0059513 | A1* | 3/2016 | Hollander ............... B32B 5/024 700/98 |
| 2019/0022599 | A1 | 1/2019 | Takeuchi et al. |
| 2019/0126572 | A1* | 5/2019 | Velez De Mendizabal Alonso .... B29D 24/004 |
| 2019/0382543 | A1* | 12/2019 | Fujioka .................. B29C 70/06 |
| 2020/0307148 | A1 | 10/2020 | Takebe et al. |
| 2021/0016474 | A1 | 1/2021 | Shinohara et al. |

FOREIGN PATENT DOCUMENTS

| | | | | |
|---|---|---|---|---|
| JP | | 2012500864 A | 1/2012 | |
| JP | | 2013511629 A | 4/2013 | |
| WO | | 2014103711 A1 | 7/2014 | |
| WO | | 2018117181 A1 | 6/2018 | |
| WO | WO-2018117180 A1 * | | 6/2018 | ............ B29C 43/18 |
| WO | | 2019189384 A1 | 10/2019 | |

OTHER PUBLICATIONS

International Search Report and Written Opinion for International Application No. PCT/JP2020/042587, dated Jan. 19, 2021, 6 pages.
Search Report dated Apr. 29, 2024, by the Taiwan Patent Office in corresponding Taiwan Patent Application No. 109141504 (2 pages).

* cited by examiner

FIBER-REINFORCED COMPOSITE MATERIAL AND SANDWICH STRUCTURE

CROSS REFERENCE TO RELATED APPLICATIONS

This is the U.S. National Phase application of PCT/JP2020/042587, filed Nov. 16, 2020 which claims priority to Japanese Patent Application No. 2019-216112, filed Nov. 29, 2019, the disclosures of each of these applications being incorporated herein by reference in their entireties for all purposes.

FIELD OF THE INVENTION

The present invention relates to a fiber-reinforced composite material achieving both lightweight properties and mechanical properties.

BACKGROUND OF THE INVENTION

A fiber-reinforced composite material obtained by using a thermosetting resin or a thermoplastic resin as a matrix and combining with a reinforcing fiber such as a carbon fiber or a glass fiber has excellent mechanical properties such as strength and rigidity, flame retardancy, and corrosion resistance while being lightweight, and has been thus applied to many fields such as aerospace, automobile, railway vehicle, ship, civil engineering and construction, electronic equipment, industrial machinery, and sports goods. Whereas, from the viewpoint of improvement in fuel efficiency and portability, further weight reduction has been required for members and housings, and porous fiber-reinforced composite materials with pores formed have also been developed. However, such a porous fiber-reinforced composite material is problematic in that mechanical properties are dramatically deteriorated as the ratio of pores is increased for the purpose of weight reduction. Therefore, there has been a demand for a technique for both reduction in the weight of a fiber-reinforced composite material and mechanical properties.

Patent Document 1 discloses a composite structure having reinforcing fibers, a resin, and pores, and having a protrusion for reinforcement as a technique for achieving both weight reduction and mechanical properties of a fiber-reinforced composite material. Patent Document 2 discloses a core structure composed of a cured resin and a nonwoven sheet and having a zigzag cross section. Patent Document 3 discloses a structure composed of paper including carbon fibers having cross-sections with different diameters, and a core structure obtained by folding the structure so as to form a zigzag cross section.

PATENT DOCUMENTS

Patent Document 1: WO 2018/117181 A
Patent Document 2: Japanese Patent Laid-open Publication No. 2012-500864
Patent Document 3: Japanese Patent Laid-open Publication No. 2013-511629

SUMMARY OF THE INVENTION

Patent Document 1 is a technique for reducing weight by increasing the total amount of fine pores, and is problematic in that deterioration of mechanical properties is significant due to weight reduction. In the above document, a reinforcing structure such as a rib or a boss is adopted; however, this is a reinforcing structure disposed on the surface of the composite structure, and thus has problems of requiring a specific molding die and thickness reduction. In the methods described in Patent Document 2 and Patent Document 3, the resin is impregnated without controlling the size and amount of the pores, and furthermore, in the zigzag-shaped structure, the zigzag-shaped structure is easily opened by the load in the bending direction, and is insufficient to achieve both weight reduction and mechanical properties. An object of the present invention is to provide a fiber-reinforced composite material having both lightweight properties and mechanical properties.

The present invention according to various embodiments for solving such problems is a fiber-reinforced composite material including: a resin (A); and a reinforcing fiber (B), and including: a fiber-reinforced structure portion including an in-plane orientation portion having an average fiber orientation angle of the reinforcing fiber (B) of 0° or more and 45° or less and an out-of-plane orientation portion having an average fiber orientation angle of the reinforcing fiber (B) of more than 45° and 90° or less; and a cavity portion defined by the in-plane orientation portion and the out-of-plane orientation portion of the fiber-reinforced structure portion.

The present invention can provide a fiber-reinforced composite material achieving both lightweight properties and mechanical properties at a high level.

DETAILED DESCRIPTION OF EMBODIMENTS OF THE INVENTION

<Fiber-Reinforced Composite Material>

Figure 1:
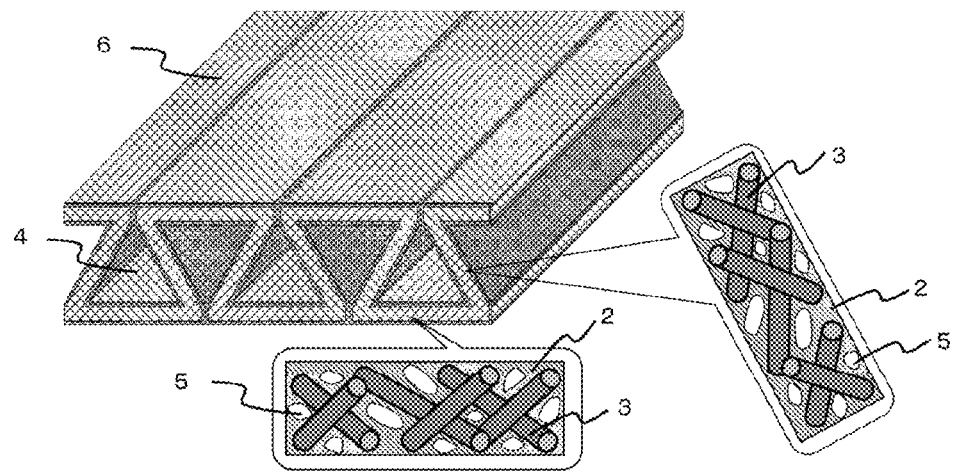
FIG. 1 is a schematic view showing one embodiment of the fiber-reinforced composite material of the present invention.

The fiber-reinforced composite material according to various embodiments of the present invention includes: a resin (A); and a reinforcing fiber (B), and includes: a fiber-reinforced structure portion including an in-plane orientation portion having an average fiber orientation angle of the reinforcing fiber (B) of 0° or more and 45° or less and an out-of-plane orientation portion having an average fiber orientation angle of the reinforcing fiber (B) of more than 45° and 90° or less; and a cavity portion defined by the in-plane orientation portion and the out-of-plane orientation portion of the fiber-reinforced structure portion.

Hereinafter, the fiber-reinforced composite material of the present invention will be described with reference to the drawings as appropriate; however, the present invention is not limited to these drawings. However, as will be readily understood by those skilled in the art, the description of the embodiments described in the drawings may also serve as a description of the fiber-reinforced composite material of the present invention as a superordinate concept.

FIG. 1 is a schematic view showing one embodiment of the fiber-reinforced composite material of the present invention together with an enlarged image of a fiber-reinforced structure portion. There is shown a cavity portion 4 that is defined by a fiber-reinforced structure portion 6 and is a space having a substantially triangular cross section (definition is described later). As shown in the enlarged image, the fiber-reinforced structure portion 6 includes a resin (A) 2 and a reinforcing fiber (B) 3. In the embodiment of FIG. 1, the fiber-reinforced structure portion 6 also includes micropores 5.

Figure 2:
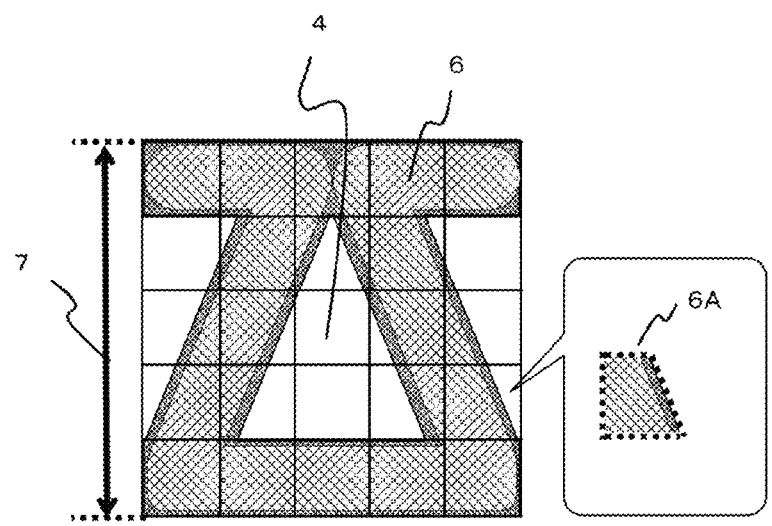
FIG. 2 is an enlarged schematic view showing one embodiment of a fiber-reinforced structure portion that defines a cavity portion of the fiber-reinforced composite material of the present invention.
Figure 3:
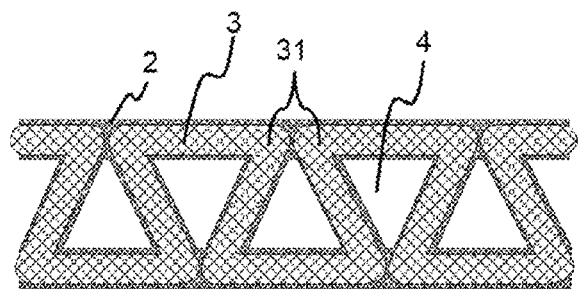
FIG. 3 is a schematic cross-sectional view showing one embodiment of the fiber-reinforced composite material of the present invention.

FIG. 3 is a schematic cross-sectional view of the fiber-reinforced composite material of the embodiment of FIG. 1 in a cross section orthogonal to the extending direction of the cavity portion. In addition, FIG. 2 is an enlarged schematic view showing one embodiment of a fiber-reinforced structure portion that defines a cavity portion. In the present specification, the "cross section" of the fiber-reinforced composite material refers to a cross section orthogonal to the extending direction of the cavity portion unless otherwise specified. That is, the space portion of the fiber-reinforced composite material of the present invention extends.

In the cross section of the fiber-reinforced composite material, an opening portion of the cavity portion and a fiber-reinforced structure portion surrounding the opening portion are observed. That is, the cavity portion exists as a tunnel-shaped space surrounded by the fiber-reinforced structure portion.

The cavity portion preferably has more than 500 μm of the average value of the maximum lengths of the cross-sectional opening portion. Herein, the maximum length of the cross-sectional opening portion is a maximum length that can be linearly drawn in the opening portion in the cross section of the fiber-reinforced composite material. When the average value of the maximum lengths of the opening portions is more than 500 μm, the weight reduction effect can be significant. The average value of the maximum lengths of the cross-sectional opening portions of the cavity portions is preferably 1000 μm or more and 10000 μm or less, more preferably 1500 μm or more and 6500 μm or less, and still more preferably 2500 μm or more and 4500 μm or less.

In the embodiment shown in FIG. 3, in the cross section, the opening portion of the cavity portion is illustrated as a substantially triangular shape with three sides surrounded by the fiber-reinforced structure portion. In addition, in the embodiment shown in FIG. 13, in the cross section, the opening portion of the cavity portion is illustrated as a substantially trapezoidal shape with three sides formed by the fiber-reinforced structure portion.

As described above, the cavity portion according to various embodiments of the present invention is surrounded by the fiber-reinforced structure portion, and the substantially trapezoidal cavity portion in which the opening portion has three sides formed by the fiber-reinforced structure portion, that is, the cavity portion in which one side is not surrounded is the cavity portion of the present invention when the fiber-reinforced structure portion has an in-plane orientation portion having an average fiber orientation angle of 0° or more and 45° or less and an out-of-plane orientation portion having an average fiber orientation angle of more than 45° and 90° or less, as described later. The cavity portion of the present invention is preferably surrounded by the fiber-reinforced structure portion.

The shape of the cross-sectional opening portion of the cavity portion is not particularly limited, and is preferably a substantially polygonal shape or a substantially elliptical shape (including a substantially circular shape), and more preferably a substantially triangular shape or a substantially circular shape.

In embodiments of the present invention, the fiber-reinforced structure portion has an in-plane orientation portion and an out-of-plane orientation portion having different fiber orientations of the reinforcing fiber (B), that is, different average fiber orientation angles, and the cavity portion is partitioned by the in-plane orientation portion and the out-of-plane orientation portion.

Herein, the average fiber orientation angle is an arithmetic average value of acute angles formed by a reference line and reinforcing fibers when the reference line (0°) is assumed in an in-plane direction in a cross section of the fiber-reinforced composite material and attention is paid to the reinforcing fibers intersecting the reference line.

There is shown a method for determining whether a portion of a fiber-reinforced structure portion is an in-plane orientation portion or an out-of-plane orientation portion, as follows. As shown in FIG. 2, the arithmetic average value of thicknesses 7 of the fiber-reinforced composite material observed in the cross section is determined, and the fiber-reinforced structure portion is divided into square grids each having a length of ⅕ of the arithmetic average value of the thicknesses 7 as one side. Hereinafter, the cross section of the fiber-reinforced structure portion divided as described above is referred to as a "divided cross section". Then, for each of the divided cross sections, the average fiber orientation angle is measured while moving the reference line in the thickness direction, and a portion having a divided cross section having an average fiber orientation angle of 0° or more and 45° or less is defined as an in-plane orientation portion, and a portion having a divided cross section of more than 45° and 90° or less is defined as an out-of-plane orientation portion.

For example, in FIG. 2, as an example of the divided cross section 6A of one fiber-reinforced structure portion divided as described above, the average fiber orientation angle is determined for the divided cross section, and the divided cross section is determined to be the in-plane orientation portion or the out-of-plane orientation portion.

In the fiber-reinforced composite material according to embodiments of the present invention, the cavity portion is a space defined by the in-plane orientation portion and the out-of-plane orientation portion identified as described above. In other words, the cavity portion faces one or more of the in-plane orientations and one or more of the out-of-plane orientations. The cavity portion is preferably defined by an in-plane orientation portion having an average fiber orientation angle of 0° or more and 30° or less, and more preferably defined by an in-plane orientation portion having an average fiber orientation angle of 0° or more and 15° or less. In addition, the cavity portion is preferably defined by an out-of-plane orientation portion having an average fiber orientation angle of 60° or more and 90° or less, and more preferably defined by an out-of-plane orientation portion having an average fiber orientation angle of 75° or more and 90° or less.

Furthermore, the cavity portion is preferably defined by an in-plane orientation portion having an average fiber orientation angle of 0° or more and 30° or less and an out-of-plane orientation portion having an average fiber orientation angle of 60° or more and 90° or less, and more preferably defined by an in-plane orientation portion having an average fiber orientation angle of 0° or more and 15° or less and an out-of-plane orientation portion having an average fiber orientation angle of 75° or more and 90° or less. Furthermore, the cavity portion is preferably defined only by an in-plane orientation portion having an average fiber orientation angle of 0° or more and 30° or less and an out-of-plane orientation portion having an average fiber orientation angle of 60° or more and 90° or less, and more preferably defined only by an in-plane orientation portion having an average fiber orientation angle of 0° or more and 15° or less and an out-of-plane orientation portion having an average fiber orientation angle of 75° or more and 90° or less. Having such a structure can enhance the reinforcing effect of the reinforcing fiber (B) on the cavity portion.

Furthermore, the cross-sectional areas of the in-plane orientation portion and the out-of-plane orientation portion can be obtained by determining the cross-sectional area of the divided cross section 6A of the fiber-reinforced structure portion. The cross-sectional area of the in-plane orientation portion and the cross-sectional area of the out-of-plane orientation portion occupied in the observation image of the fiber-reinforced composite material can be obtained by performing the same determination and measurement of the cross-sectional area for all the divided cross sections in the observation image and obtaining the sum for each of the in-plane orientation portion and the out-of-plane orientation portion. In the cross section of the fiber-reinforced composite material according to embodiments of the present invention, the cross-sectional area of the out-of-plane orientation portion of the fiber-reinforced structure portion is preferably 0.5 times or more and 10 times or less, more preferably 0.6 times or more and 2 times or less, still more preferably 0.6 times or more and 0.8 times or less, as compared with the cross-sectional area of the in-plane orientation portion. Such a range is preferable, because a reinforcing effect can be obtained in both the in-plane direction and the out-of-plane direction, both weight reduction due to the cavity portion and suppression of deformation of the pores can be achieved, and both weight reduction and suppression of deterioration of mechanical properties can be achieved at a high level.

In embodiments of the present invention, the resin (A) constituting the matrix of the fiber-reinforced structure portion may be a thermoplastic resin or a thermosetting resin, and is preferably a thermoplastic resin. When the resin (A) is a thermosetting resin, heat resistance is excellent; however, in a production method using a prepreg described later, the cured resin (A) may be unpreferable. The prepreg is composed of the resin (A) and a reinforced fiber substrate (B') that is the sheet-shaped reinforcing fiber (B); however, the resin (A) is cured, which may not develop the restoring force of the folded structure of the reinforced fiber substrate (B') of the prepreg. The resin (A) is preferably a thermoplastic resin, because melting and softening of the resin (A) in heat molding can be performed stably, and a fiber-reinforced composite material excellent in lightweight properties can be obtained.

Examples of the thermoplastic resin include: polyester-based resins such as polyethylene terephthalate and polybutylene terephthalate; polyolefins such as polyethylene, polypropylene, polybutylene, and modified polypropylene; polyamides such as polyoxymethylene, polyamide 6, and polyamide 66; polycarbonate; polymethyl methacrylate; polyvinyl chloride; polyarylene sulfide such as polyphenylene sulfide; polyphenylene ether; modified polyphenylene ether; polyimide; polyamideimide; polyetherimide; polysulfone; modified polysulfone; polyethersulfone; polyarylene ether ketones such as polyketone, polyether ketone, polyether ether ketone, and polyether ketone ketone; polyarylate; polyether nitrile; and phenoxy resin. In addition, these thermoplastic resins may be copolymers or modified products, and/or blended resins of two or more thereof.

Among these, the thermoplastic resin is more preferably at least one selected from the group consisting of polyolefins, polycarbonates, polyesters, polyarylene sulfides, polyamides, polyoxymethylenes, polyetherimides, polyethersulfones, and polyarylene ether ketones from the viewpoint of balance between molding processability, heat resistance, and mechanical properties, and is still more preferably polypropylene from the viewpoint of productivity and cost.

The resin (A) may further contain other fillers and additives depending on the use, as long as the object of the present invention is not impaired. Examples thereof include inorganic fillers, flame retardants, conductivity imparting agents, crystal nucleating agents, ultraviolet absorbers, antioxidants, damping agents, antibacterial agents, insect repellents, deodorants, coloring inhibitors, heat stabilizers, mold release agents, antistatic agents, plasticizers, lubricants, coloring agents, pigments, dyes, foaming agents, antifoaming agents, and coupling agents.

The melting point of the thermoplastic resin used as the resin (A) is preferably 100° C. or more and 400° C. or less, more preferably 120° C. or more and 300° C. or less, and still more preferably 140° C. or more and 250° C. or less. Such a temperature range is preferable, because both molding processability into a fiber-reinforced composite material and heat resistance of the resulting fiber-reinforced composite material can be achieved. In addition, the glass transition temperature of the thermoplastic resin used as the resin (A) is preferably 0° C. or more and 250° C. or less, more preferably 50° C. or more and 200° C. or less, and still more preferably 100° C. or more and 160° C. or less. Particularly when the resin (A) is an amorphous thermoplastic resin, the glass transition temperature of the thermoplastic resin is preferably such a temperature range, because both molding processability into a fiber-reinforced composite material and heat resistance of the resulting fiber-reinforced composite material can be achieved.

Examples of the reinforcing fiber (B) include carbon fibers, glass fibers, metal fibers, aromatic polyamide fibers, polyaramid fibers, alumina fibers, silicon carbide fibers, boron fibers, and basalt fibers. They may be used singly or may be appropriately used in combination of two or more. Among these, the reinforcing fiber (B) is preferably the carbon fiber from the viewpoint of excellent lightweight and mechanical properties. The reinforcing fiber (B) preferably have an elastic modulus of 200 GPa or more. In addition, the carbon fiber is preferable as the reinforcing fiber, and the carbon fiber having an elastic modulus of 200 GPa or more is particularly preferable.

In embodiments of the present invention, the reinforcing fiber (B) is preferably a discontinuous fiber, more specifically, the number average fiber length is preferably 1 mm or more and 50 mm or less, the number average fiber length is more preferably 3 mm or more and 20 mm or less, and still more preferably 4 mm or more and 10 mm or less. Such a range is preferable, because the distance between the reinforcing fibers (B) can be easily increased, and the formation of micropores can be easily controlled. In addition, in the fiber-reinforced structure portion, preferably, the discontinuous fibers are randomly dispersed. The discontinuous fibers are randomly dispersed, whereby concentration difference between the resin (A) and the reinforcing fiber (B) is small, and a fiber-reinforced composite material excellent in isotropy is obtained.

As shown in FIG. 1, the fiber-reinforced structure portion 6 preferably includes the reinforcing fiber (B) 3 and the resin (A) 2 as a matrix, and has a large number of the micropores 5 in the resin (A) 2. The fiber-reinforced structure portion does not need to have micropores as a whole, and micropores may be formed in a region where the reinforcing fiber (B) exists. For example, as shown in FIG. 3, when there is a region composed only of the resin (A) 2 not only inside the region where the reinforcing fibers (B) 3 are present but also outside the region where the reinforcing fibers (B) 3 are present, both (the region where the reinforcing fibers (B) 3 are present and the region composed only of the resin (A) 2) are referred to as a fiber-reinforced structure portion in the present specification; however, micropores may not be formed in the latter region composed only of the resin (A) 2.

Figure 4:
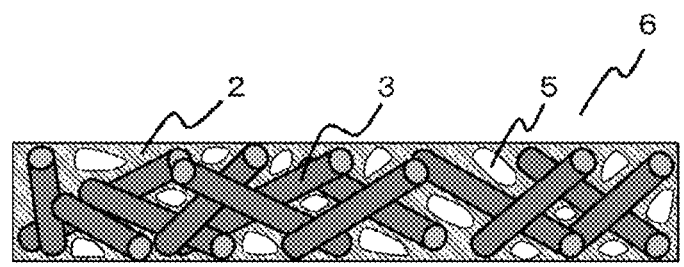
FIG. 4 is an enlarged schematic view showing a fiber-reinforced structure portion in one embodiment of the fiber-reinforced composite material of the present invention.

As shown in FIG. 4, preferably, the fiber-reinforced structure portion is formed by impregnating the resin (A) between networks formed of the reinforcing fibers (B), and has micropores in the resin (A) between the reinforcing fibers (B). With such a structure, the weight of the porous body can be reduced, and the reinforcing effect by the reinforcing fiber (B) can be exhibited.

The fiber-reinforced structure portion preferably has micropores having an average pore diameter of 500 µm or less as measured by a mercury intrusion method. The average pore diameter is preferably 200 µm or less, more preferably 10 µm or more and 150 µm or less, still more preferably 30 µm or more and 100 µm or less. Too small average pore diameter may cause the weight reduction effect to be insufficient, and too large average pore diameter may cause mechanical properties to be deteriorated.

The mercury intrusion method is a method for measuring a pore size with a mercury intrusion porosimeter, wherein mercury is injected into a sample at a high pressure and the pore size can be determined from the applied pressure and the amount of injected mercury. The average pore diameter is a value that can be determined from the following formula (1):

$$\text{(Average pore diameter)} = 4 \times \text{(pore volume)} / \text{(specific surface area)} \quad (1).$$

In addition, in embodiments of the present invention, the specific gravity of the fiber-reinforced structure portion is preferably 0.3 g/cm$^3$ or more and 0.8 g/cm$^3$ or less, and more preferably 0.4 g/cm$^3$ or more and 0.7 g/cm$^3$ or less. When less than such a range, mechanical properties may be deteriorated, and when more than such a range, the weight reduction effect may be insufficient. Herein, the specific gravity is a value obtained by dividing the mass [g] of the sample obtained by cutting out only the fiber-reinforced structure portion by the volume [cm$^3$] obtained from the sample shape, and is an arithmetic average value of specific gravities measured for five randomly extracted samples.

As the entire fiber-reinforced composite material, the specific gravity is preferably 0.001 g/cm$^3$ or more and 0.2 g/cm$^3$ or less, more preferably 0.01 g/cm$^3$ or more and 0.15 g/cm$^3$ or less, and still more preferably 0.01 g/cm$^3$ or more and 0.1 g/cm$^3$ or less. When less than such a range, mechanical properties may be insufficient. When more than such a range, the weight reduction effect may be insufficient. A specific gravity of 0.1 g/cm$^3$ or less is preferable, because generally mechanical properties are particularly difficult to be exhibited, and the effect of the present invention can be efficiently exhibited. Herein, the specific gravity is a value obtained by dividing the sample mass [g] by the volume [cm$^3$] obtained from the sample shape.

In addition, in the fiber-reinforced composite material of the present invention, the reinforcing fiber (B) is preferably in an amount of 10 parts by mass or more and 100 parts by mass or less, and the reinforcing fiber (B) is more preferably in an amount of 20 parts by mass or more and 50 parts by mass or less, with respect to 100 parts by mass of the resin (A). When less than such a range, the reinforcing effect by the reinforcing fiber (B) may be insufficient. When more than such a range, the weight reduction effect by the reinforcing fiber (B) may be insufficient.

The thickness of the fiber-reinforced composite material is preferably 0.1 mm or more and 5 mm or less, and more preferably 0.6 mm or more and 3 mm or less. Such a range is preferable, because the effect of lightweight and excellent mechanical properties in the present invention can be efficiently exhibited although the thickness is thin. Particularly, a fiber-reinforced composite material having pores tends to have difficulty in maintaining pressure in a step of pressure-bonding other materials such as a pressing step. The fiber-reinforced composite material in the present invention, which achieves both lightweight properties and mechanical properties by controlling the pores, is preferable because it can be preferably applied to such a pressure-bonding step.

Furthermore, the fiber-reinforced composite material of the present invention preferably has a structure in which the opening portion of the cavity portion is aligned in an in-plane direction in a cross section, and may further have a laminated structure in which a plurality of layers having such a structure are laminated. Such a laminated structure is preferable, because a thick or uneven molded product can be easily obtained. In addition, it is more preferable to have a laminated structure in which the layers with the opening portions aligned in the in-plane direction are laminated while changing the extending direction of the cavity portion for each layer, and it is still more preferable to have a laminated structure in which the lamination is performed so that the extending direction of the cavity portion for each layer is orthogonal to each other. In this case, in the above description regarding the fiber-reinforced composite material according to embodiments of the present invention, the content described using the extending direction of the cavity portion should be understood as the description for each layer. The number of the laminated layers is preferably 2 or more and 50 or less, and more preferably 2 or more and 10 or less.

The lamination method is not particularly limited, and examples thereof include a method of heating a prepreg after lamination, and a method of laminating a fiber-reinforced composite material that has been previously heated and molded. There is no particular limitation on the bonding between the layers during lamination, and examples thereof include bonding with an adhesive and heat welding. Particularly, as described later, the fiber-reinforced composite material of the present invention having an excellent expansion force is preferable because of having an excellent pore holding ability in a heating and pressurizing process during heat welding.

<Sandwich Structure>

The fiber-reinforced composite material of the present invention is also preferably a sandwich structure in which skin layers composed of another fiber-reinforced resin are disposed on both surfaces thereof. Preferably, the skin layer is a layer having a higher elastic modulus than that of the fiber-reinforced composite material. The method for bonding the skin layers is not particularly limited, and examples thereof include bonding with an adhesive and heat welding. Particularly, as described later, the fiber-reinforced composite material of the present invention having an excellent expansion force is preferable because of having an excellent pore holding ability in a heating and pressurizing process during heat welding.

The same type of the reinforcing fiber as the above reinforcing fiber (B) can be preferably used as the reinforcing fiber included in the fiber-reinforced resin of the skin layer, and the carbon fiber is preferable from the viewpoint of lightweight properties, mechanical properties, and economic efficiency. The reinforcing fiber constituting the fiber-reinforced resin of the skin layer preferably has a number average fiber length of 100 mm or more, and preferably 150 mm or more. The upper limit of the length of the reinforcing fiber is not particularly limited, and the reinforcing fiber may be continuous over the entire width of the skin layer in the fiber orientation direction or may be divided in the middle. From the viewpoint of mechanical properties of the sandwich structure, continuous reinforcing fibers are preferably arranged in one direction. In addition, from the viewpoint of isotropy of mechanical properties, the skin layer particularly preferably has a structure in which a fiber-reinforced resin layer with reinforcing fibers arranged in one direction is laminated in a plurality of layers while changing a lamination angle, that is, while changing an arrangement direction of the reinforcing fibers in each layer.

In addition, the resin included in the fiber-reinforced resin of the skin layer is preferably a thermosetting resin. Examples of the thermosetting resin include unsaturated polyester resins, vinyl ester resins, epoxy resins, phenol resins, urea resins, melamine resins, thermosetting polyimide resins, cyanate ester tree, bismaleimide resins, benzoxazine resins, copolymers or modified products thereof, and resins obtained by blending at least 2 kinds thereof. Among these, an epoxy resin excellent in mechanical properties, heat resistance, and adhesion to the reinforcing fiber is preferable as the thermosetting resin.

<Method for Producing Fiber-Reinforced Composite Material>

As an example, the fiber-reinforced composite material according to embodiments of the present invention is a prepreg obtained by impregnating a reinforced fiber substrate (B'), which is a sheet-shaped reinforcing fiber (B), with the resin (A), and can be produced by heating a prepreg in which the reinforced fiber substrate (B') exists in a folded state having a plurality of folds with a fold angle of 0° or more and less than 90° in the prepreg, to a temperature equal to or higher than a temperature at which the resin (A) is melted or softened, and then molding. The reinforced fiber substrate (B') is folded at a fold angle of 0° or more and less than 90°, whereby folds are going to extend to return the unfolded structure, that is, the restoring force, which is the force in the direction in which the fold angle expands, is released, and the expansion force in the thickness direction of the prepreg can be obtained in the molding of the prepreg into the fiber-reinforced composite material. The reinforced fiber substrate (B') in the prepreg is heated and molded to become the reinforcing fiber (B) in the fiber-reinforced structure portion of the fiber-reinforced composite material.

Figure 5:
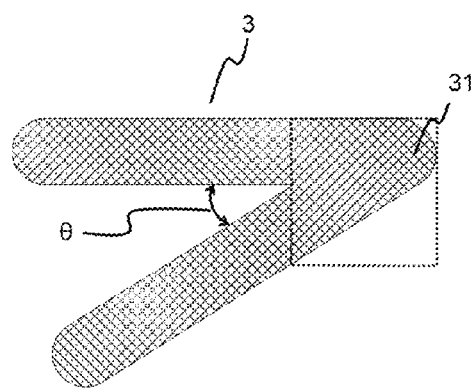
FIG. 5 is a schematic view for explaining a fold angle of a reinforced fiber substrate (B') in one embodiment of a prepreg.

Hereinafter, such a prepreg will be described. The fold angle in the present specification is an angle θ formed by a bent portion of the reinforced fiber substrate (B') 3 around a fold 31 as shown in FIG. 5 when viewing a cross section orthogonal to the direction of the fold (hereinafter, unless otherwise specified in the present specification, the "cross section" of the prepreg means a cross section orthogonal to the direction of the fold). The fold angle of the reinforced fiber substrate (B') is preferably 0° or more and 75° or less, more preferably 0° or more and 45° or less, still more preferably 0° or more and 15° or less, and particularly preferably 1° or more and 5° or less. Such a range is preferable, because the expansion force in molding into the fiber-reinforced composite material can be increased.

The reinforced fiber substrate (B') is preferably folded in such a manner that a first fold is adjacent to at least one of two folds of the n-th (n is an integer of 4 or more), when counting in the order such that an optionally selected fold is the first fold in the cross section, two folds adjacent to both sides of the first fold are a second fold, two folds further adjacent to the outside of the second fold are a third fold, and two folds further adjacent to the outside of the third fold are a fourth fold. Folding in this manner causes a region obtained by folding between adjacent folds when the folds are extended to easily form a space, easily forming a cavity portion. In the present specification, the term "adjacent" is used as a term representing a concept including a case of being in contact. In addition, hereinafter, in the present specification, the first fold and the n-th fold that are adjacent to the first fold in such a manner may be simply referred to as "a pair of adjacent folds". In addition, when the reinforced fiber substrate (B') has a substantially trapezoidal shape, a pair of folds corresponding to both ends of the shorter base correspond to "a pair of adjacent folds".

In addition, in this case, Lr/Lf is preferably 0.3 or less and Lf is preferably 1 mm or more and 200 mm or less in the cross section, wherein Lr is a linear distance between a pair of adjacent folds, and Lf is a distance connected between a pair of adjacent folds along the reinforced fiber substrate (B'). Lr/Lf is more preferably 0.2 or less, and still more preferably 0.05 or less. Lf is more preferably 1 mm or more and 100 mm or less, still more preferably 2 mm or more and 50 mm or less, and particularly preferably 3 mm or more and 10 mm or less. Such a range is preferable, because the pore size in molding into the fiber-reinforced composite material can be easily controlled.

Hereinafter, in order to further facilitate understanding, the folded state of the reinforced fiber substrate (B') will be described with reference to the drawings specifically illustrating the folded state of the reinforced fiber substrate (B'). The folded state of the reinforced fiber substrate (B') is not limited by these drawings.

Figure 6:
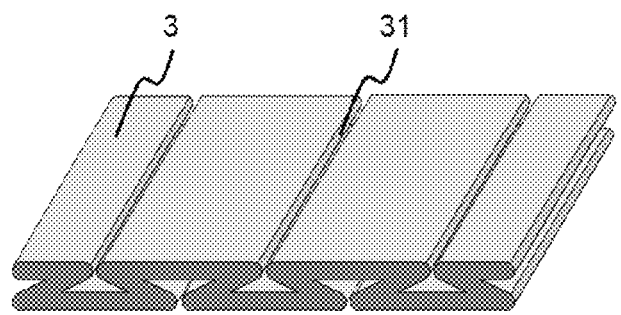
FIG. 6 is a schematic view showing a folded state of the reinforced fiber substrate (B') in one embodiment of a prepreg.

FIG. 6 is a schematic perspective view showing only the reinforced fiber substrate (B') taken out for explaining the folded state of the reinforced fiber substrate (B') in the prepreg in one embodiment. In addition, FIG. 7 is a schematic cross-sectional view of the prepreg in the same embodiment, and FIG. 8 is a schematic cross-sectional view with a part thereof further enlarged.

In the present embodiment, the reinforced fiber substrate (B') is in a folded state including a Z-shaped structure having bending points that are a first fold and at least one of second folds adjacent to the first fold when the first fold is an optionally selected fold in the cross section. For example, when a fold indicated by 31A in FIG. 8 is a first fold, the reinforced fiber substrate (B') is folded so as to form a Z-shaped structure having bending points that are the first fold and a fold indicated by 31B of one of second folds adjacent to the first fold in the cross section. Such a folded structure generates a force that causes the Z-shaped structure to extend up and down, easily forming the cavity portion in the fiber-reinforced composite material. The reinforced fiber substrate (B') is in a folded state in which such a Z-shaped structure is continuous, allowing providing a large restoring force as a whole.

More specifically, in the present embodiment, the reinforced fiber substrate (B') has a folded structure including a substantially triangular structure formed in such a manner that a first fold is adjacent to one of fourth folds when a certain fold is the first fold in the cross section, wherein two folds adjacent to both sides of the first fold are a second fold, two folds further adjacent to the outside of the second fold are a third fold, and two folds further adjacent to the outside of the third fold are the fourth fold. For example, when a fold indicated by 31A in FIG. 8 is the first fold, one of the second folds is 31B, one of the third folds is 31C, and one of the fourth folds is a fold indicated by 31D, and the reinforced fiber substrate (B') has a folded structure including a substantially triangular structure formed by the first fold 31A adjacent to the fourth fold 31D. Herein, the first fold 31A and the fourth fold 31D may be adjacent each other or may be separated to some extent. That is, according to the above description, in the present embodiment, the fold 31A and the fold 31D are a pair of adjacent folds. In the former case, it can be said that a substantially triangular structure is formed by the contact point between the first fold 31A and the fourth fold 31D, the second fold 31B, and the third fold 31C, and in the latter case, it can be said that a substantially triangular structure with one end opened is formed by separation between the first fold 31A and the fourth fold 31D. In the present specification, the term "substantially triangular" is used as a term including such a structure. Such a folded structure generates a force that causes the substantially triangular structure to extend up and down, allowing providing a restoring force.

Figure 7:
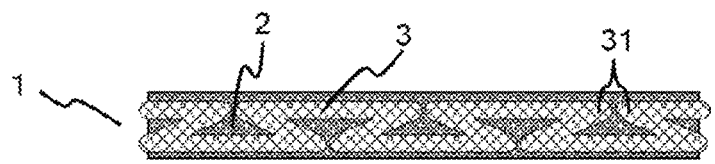
FIG. 7 is a schematic cross-sectional view showing one embodiment of a prepreg.
Figure 8:
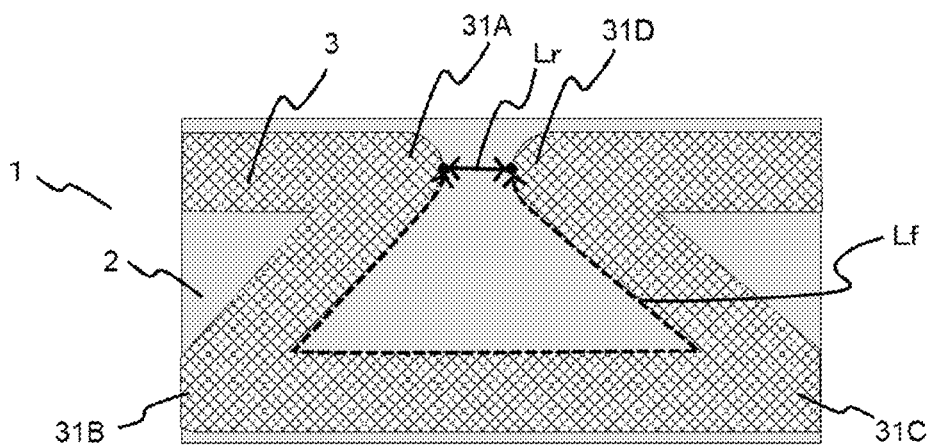
FIG. 8 is an enlarged schematic cross-sectional view showing a part of the prepreg of the embodiment shown in FIG. 7.

Furthermore, in the present embodiment, as shown in FIG. 7, the reinforced fiber substrate (B') has a folded structure in which the folded structure including the substantially triangular structure is not only reversed but also continuous. Having such a regular folded structure easily controls the expansion force in a desired direction. The reinforced fiber substrate (B') preferably has a regular folded structure over the entire prepreg in order to provide uniform expansion force, which is not limited to the present embodiment.

In addition, in the present embodiment, preferably, Lr/Lf is 0.3 or less and Lf is 1 mm or more and 200 mm or less, wherein Lr is a linear distance between the first fold and the fourth fold adjacent to the first fold, and Lf is a distance connecting the first fold to the fourth fold along the reinforced fiber substrate (B'). As shown in FIG. 8, Lr is the shortest distance between the surfaces of the reinforced fiber substrates (B') in a pair of adjacent folds. Lf corresponds to the length of the reinforced fiber substrate (B') between a pair of adjacent folds, that is, from the first fold 31A to the fourth fold 31D in FIG. 8. Lr/Lf is preferably 0.2 or less, and more preferably 0.05 or less. Lf is more preferably 1 mm or more and 100 mm or less, still more preferably 2 mm or more and 50 mm or less, and particularly preferably 3 mm or more and 10 mm or less. Setting the ratio of Lr to Lf within such a range easily suppresses the expansion in the in-plane direction by canceling the restoring force in the in-plane direction, easily forms the cavity portion having the circumferential length corresponding to Lf, and easily controls the hole size of the cavity portion.

Figure 12:
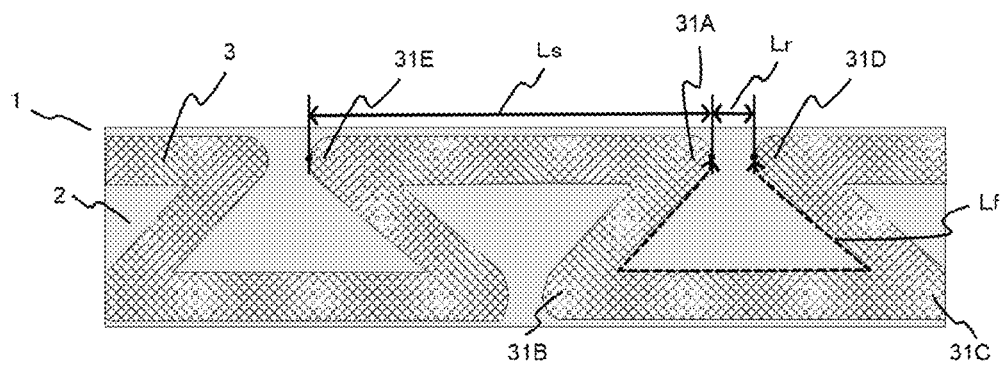
FIG. 12 is an enlarged schematic cross-sectional view showing a part of the prepreg of the embodiment shown in FIG. 7.

In addition, when a linear distance between the first fold and the adjacent fourth fold is defined as Lr, a linear distance between the first fold and the second fold existing in a direction opposite to a direction in which a distance Lf connecting the first fold to the fourth fold along the reinforced fiber substrate (B') is measured is defined as Ls. In this case, the Lr and Ls are alternately continuous along the surface of the prepreg. For example, when a fold indicated by 31A in FIG. 12 is the first fold, one of the second folds is 31B, one of the third folds is 31C, and one of the fourth folds is a fold indicated by 31D, and the cross section of the reinforced fiber substrate (B') has a folded structure including a substantially triangular structure formed by the first fold 31A adjacent to the fourth fold 31D. Whereas, the linear distance between the other of the second folds 31E and 31A is Ls.

Ls is preferably 0.1 mm or more and 50 mm or less, more preferably 1 mm or more and 10 mm or less, and still more preferably 2 mm or more and 5 mm or less. Furthermore, Lr/Ls is preferably 0 or more and less than 0.8, more preferably 0 or more and 0.3 or less, and still more preferably 0 or more and 0.2 or less. Such a range is preferable, because in the fiber-reinforced composite material obtained by expanding the prepreg, the maximum length of the cross-sectional opening portion and the ratio between the in-plane orientation portion and the out-of-plane orientation portion can be controlled, and deflection under load can be controlled.

Figure 9:
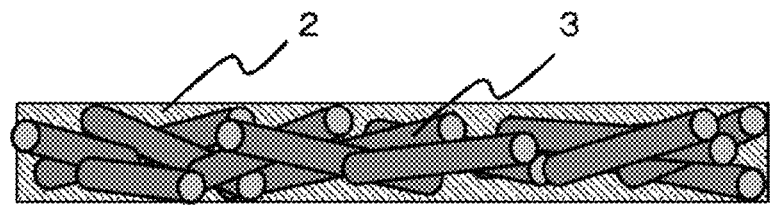
FIG. 9 is an enlarged schematic view showing the periphery of the reinforced fiber substrate (B') in one embodiment of a prepreg.

The reinforced fiber substrate (B') is preferably a nonwoven fabric composed of the discontinuous reinforcing fiber (B). FIG. 9 is an enlarged schematic view showing one embodiment of the reinforced fiber substrate (B') included in the prepreg described above together with the resin (A) impregnated therein. In the present embodiment, the reinforced fiber substrate (B') is a nonwoven fabric composed of the discontinuous reinforcing fiber. In the reinforced fiber substrate (B') impregnated with the resin (A) and in a compressed state, the resin (A) is melted or softened to release the compressed state, thereby resulting in spring back. This spring back forms fine pores between the reinforcing fibers and in the resin (A), as shown in FIG. 4. That is, micropores are formed in the reinforced fiber substrate (B'). The reinforced fiber substrate (B') is particularly preferably in the form of a nonwoven fabric in which the discontinuous reinforcing fibers (B) are randomly dispersed, and such a nonwoven fabric can be produced by, for example, an air-laid method, a carding method, and a papermaking method.

In addition, the cavity portion of the fiber-reinforced composite material of the present invention can be formed by the restoring force when the folded structure of the reinforced fiber substrate (B') in the prepreg is going to extend. FIG. 3 is a schematic cross-sectional view showing an example of a fiber-reinforced composite material molded by using the prepreg shown in FIG. 7. Heating the prepreg provides the state with the resin (A) melted or softened, thus releasing the restoring force of the folded structure of the reinforced fiber substrate (B'). This restoring force becomes the expansion force in the thickness direction of the prepreg, and this expansion force forms a cavity portion substantially surrounded by the reinforced fiber substrate (B').

Therefore, the folded structure of the reinforced fiber substrate is substantially the same as the folded structure in the prepreg described above, and the description of the folded structure follows the description in the prepreg described above. However, when molding is performed by using the prepreg described above, the fold angle of the reinforced fiber substrate (B') is increased by molding.

Furthermore, in the present embodiment, the resin (A) is a resin with which the reinforced fiber substrate (B') is impregnated, more specifically, a resin with which both the inside of the reinforced fiber substrate (B') and the space formed between the reinforced fiber substrates (B') by folding the reinforced fiber substrate (B') are impregnated. Furthermore, as shown in FIG. 3, the cavity portion preferably has a structure in which a pair of adjacent folds 31 of the reinforcing fibers (B) are bonded to each other by the resin (A). Such a structure suppresses deformation due to opening at a pair of adjacent folds when a load is applied to the fiber-reinforced composite material.

As an example, the prepreg as described above can be produced by a production method including the following Steps [1] and [2] in this order.

Step [1]: a step of folding the reinforced fiber substrate (B') into a folded state having a plurality of folds;

Step [2]: a step of combining the resin (A) with the folded reinforced fiber substrate (B').

In Step [1], the reinforced fiber substrate (B') is folded in the folded state described above. Generally, a reinforcing fiber having a higher elastic modulus has a lower elongation and tends to be easily broken by bending. In Step [1], previously folding the reinforced fiber substrate (B') suppresses the curvature of the reinforcing fiber monofilament by the void between the reinforcing fibers, and the folding can be thus performed while suppressing the breakage of the fiber.

Examples of the method for combining the resin (A) with the reinforced fiber substrate (B') in Step [2] include a method of directly injecting the molten resin (A) into the reinforced fiber substrate (B') and a method of combining the film-shaped, powdery, or fibrous resin (A) with the reinforced fiber substrate (B') and performing the impregnation by heating and melting. From the viewpoint of ease of production, there is desirable a method of impregnating the reinforced fiber substrate (B') with the resin (A) by applying pressure with heating to a temperature equal to or higher than a temperature at which the resin (A) melts or softens. A press molding machine or a double belt press machine can be preferably used as apparatus for achieving such an impregnation method. The former is used in the case of batch type, and the productivity can be improved by using an intermittent press system in which two or more machines for heating and cooling are arranged in parallel. The latter is used in the case of continuous type, and the continuous productivity is excellent since continuous processing can be easily performed.

The fiber-reinforced composite material of the present invention can be produced by heating the prepreg to a temperature equal to or higher than a temperature at which the resin (A) melts or softens, and then molding. The resin (A) is heated to the temperature to softens, wherein the temperature equal to or higher than the temperature at which the resin (A) melts or softens, whereby releasing the restoring force with which the folded structure of the reinforced fiber substrate (B') returns to the unfolded structure, that is, the force in the direction in which the fold angle increases. This restoring force becomes an expansion force in the thickness direction of the prepreg, and the reinforced fiber substrate (B') with this expansion force expands the prepreg in a manner of pushing up by the reinforced fiber substrate (B'). FIG. 3 is a schematic cross-sectional view showing an example of a fiber-reinforced composite material molded by using the prepreg shown in FIG. 7. As described above, the prepreg is heated to soften the resin (A), whereby the reinforced fiber substrate (B') is deformed in a direction in which the fold angle of the reinforced fiber substrate (B') is enlarged, and the prepreg expands. Typically, as shown in FIG. 3, this expansion forms a fiber-reinforced structure portion having an in-plane orientation portion and an out-of-plane orientation portion, and forms a cavity portion 4 defined by the in-plane orientation portion and the out-of-plane orientation portion of the fiber-reinforced structure portion.

Specifically, the temperature at which the resin (A) melts or softens may be higher than the melting point when the resin (A) is a crystalline thermoplastic resin; however, is preferably higher than the melting point by 20° C. or more. In addition, the temperature may be higher than the glass transition temperature when the resin (A) is an amorphous thermoplastic resin; however, is preferably higher than the glass transition temperature by 20° C. or more. The upper limit temperature is preferably a temperature applied equal to or lower than the thermal decomposition temperature of the resin (A).

In addition, in the molding, the thickness of the prepreg expanded by heating is preferably adjusted. The method for controlling the thickness is not limited as long as the obtained fiber-reinforced composite material can be controlled to a desired thickness, and there are preferable, for example, a method of constraining the thickness by using a metal plate or the like, and a method of directly controlling the thickness by adjusting the pressure, from the viewpoint of simplicity of production. A press molding machine or a double belt press machine can be preferably used as apparatus for achieving such a method. The former is used for a batch-type method, and it is possible to improve the productivity by employing an intermittent-type press system including two or more machines for heating and cooling in combination. The latter is for a continuous type, which can easily perform continuous processing and is thus excellent in continuous productivity.

EXAMPLES

Materials used in examples and comparative examples are as follows.

[PP Resin]

A crystalline polypropylene resin composition composed of 80% by mass of polypropylene ("Prime Polypro" (registered trademark) J105G manufactured by PRIME POLYMER Co., Ltd.) and 20% by mass of acid-modified polypropylene ("ADMER" QB510 manufactured by Mitsui Chemicals, Inc.) and having a melting point of 160° C. measured in accordance with JIS K7121 (2012) was used. Such a polypropylene resin composition was produced as resin pellets by mixing polypropylene as a thermoplastic resin and acid-modified polypropylene as raw materials at the above mass ratio, and then melt-kneading with a twin-screw extruder at a cylinder temperature of 200° C. Furthermore, these resin pellets were press-molded by using a press molding machine adjusted so as to have a mold surface temperature of 180° C. and a film thickness of 0.22 mm to produce a PP resin film having a basis weight of 200 g/cm$^2$.

[PC Resin]

An amorphous polycarbonate resin composed of polycarbonate ("Iupilon" (registered trademark) H-4000 manufactured by Mitsubishi Engineering-Plastics Corporation) and having a glass transition temperature of 150° C. measured in accordance with JIS K7121 (2012) was used. Resin pellets of polycarbonate as a thermoplastic resin were press-molded by using a press molding machine adjusted so as to have a mold surface temperature of 240° C. and a film thickness of 0.17 mm to produce a PC resin film having a basis weight of 200 g/cm$^2$.

[Carbon Fiber Nonwoven Fabric]

A copolymer mainly composed of polyacrylonitrile was subjected to spinning, a firing treatment, and a surface oxidation treatment to provide a carbon fiber bundle having a total of 12000 monofilaments. The properties of this carbon fiber bundle were a tensile elastic modulus of 220 GPa measured in accordance with JIS R7608 (2007), and a circular cross section with a single fiber diameter of 7 μm. The carbon fiber bundle was cut into a length of 6 mm with a cartridge cutter to provide a chopped carbon fiber. A dispersion solution composed of water and a surfactant (polyoxyethylene lauryl ether (trade name) manufactured by NACALAI TESQUE, INC.) and having a concentration of 0.1% by mass was produced, and a carbon fiber substrate was produced by using this dispersion solution and the chopped carbon fiber. The production apparatus includes a cylindrical container having a diameter of 1000 mm and having an opening and closing cock at a lower part of the container as a dispersion tank, and a linear transport unit (inclination angle 30°) that connects the dispersion tank and a papermaking tank. A stirrer is attached to an opening at the top surface of the dispersing tank, and the chopped carbon fibers and the dispersion solution (dispersion medium) can be charged from the opening. The papermaking tank includes a mesh conveyor having a 500-mm wide papermaking surface at the bottom and has the mesh conveyor thereof connected to a conveyor capable of delivering a carbon fiber substrate (papermaking substrate). papermaking was performed at a carbon fiber concentration in the dispersion solution of 0.05% by mass. The carbon fiber substrate subjected to papermaking was dried in a drying furnace at 200° C. for 30 minutes to provide a carbon fiber nonwoven fabric in which the orientation directions of monofilaments of the carbon fiber were randomly dispersed.

[Thermosetting Prepreg Used in Skin Layer]

A copolymer mainly composed of polyacrylonitrile was subjected to spinning, a firing treatment, and a surface oxidation treatment to provide a carbon fiber bundle having a total of 12000 monofilaments. The properties of this carbon fiber bundle were a tensile elastic modulus of 220 GPa measured in accordance with JIS R7608 (2007), and a circular cross section with a single fiber diameter of 7 μm.

An uncured epoxy plastic composition was adjusted by heating and kneading, with a kneader, epoxy plastic (30 parts by mass of "EPIKOTE (registered trade mark)" 828, 35 parts by mass of "EPIKOTE (registered trademark)" 1001, and 35 parts by mass of "EPIKOTE (registered trademark)" 154 manufactured by Japan Epoxy Resins Co., Ltd.) and 5 parts by mass of thermoplastic polyvinyl formal ("Vinylec (registered trademark)" K manufactured by CHISSO CORPORATION) to uniformly dissolve polyvinyl formal, and then kneading, with a kneader, 3.5 parts by mass of a curing agent dicyandiamide (DICY7 manufacture by Japan Epoxy Resins Co., Ltd.) and 7 parts by mass of a curing accelerator 4,4-methylenebis (phenyldimethylurea) ("OMICURE" (registered trademark) 52 from PTI Japan Limited). From this, an epoxy resin film having a basis weight of 132 g/m$^2$ was produced by using a knife coater.

Then, a sheet with carbon fiber bundles oriented in one direction was prepared, and epoxy resin films were stacked on both surfaces thereof, and heated and pressurized to impregnate with the epoxy resin, thereby providing a thermosetting prepreg having a mass of the carbon fiber per unit area of 125 g/m$^2$, a fiber volume content of 60%, and a thickness of 0.125 mm.

The methods for evaluating, for example, the structure and physical properties in the examples and comparative examples are as follows.

[Evaluation of Fold Angle]

A sample was cut out from the prepreg so that a cross section orthogonal to the fold of the carbon fiber nonwoven fabric was an observation surface, and polishing was performed so that the cross section of the fold of the carbon fiber nonwoven fabric was able to be observed. The obtained sample was observed with a laser microscope (VK-9510 manufactured by KEYENCE CORPORATION), and in the observation image, the angle was measured by software attached to the apparatus, and for each fold, as shown in FIG. 5, there was obtained the angle θ formed by the bending portion around the fold 31 of a carbon fiber nonwoven fabric 3. A fold angle was obtained for a total of 20 folds, and the arithmetic average value was obtained.

[Evaluation of Lr and Lf]

A sample was cut out from the prepreg so that a cross section orthogonal to the fold of the carbon fiber nonwoven fabric was an observation surface, and polishing was performed so that there was able to be observed a pair of adjacent folds and the cross section of a continuous carbon fiber nonwoven fabric connecting a pair of the adjacent folds. The obtained sample was observed with a laser microscope (VK-9510 manufactured by KEYENCE CORPORATION), and in the observation image, the length was measured by software attached to the apparatus to determine a linear distance (Lr) between a pair of adjacent folds and a distance (Lf) connecting a pair of the adjacent folds along the carbon fiber nonwoven fabric. Lr, Lf, and Lr/Lf were determined for a total of 20 adjacent folds, and the arithmetic average value was determined.

[Evaluation of Ls]

A sample was cut out from the prepreg so that a cross section orthogonal to the fold of the carbon fiber nonwoven fabric was an observation surface, and polishing was performed so that a cross section in which a pair of adjacent folds of the carbon fiber nonwoven fabric were connected at a plurality of positions was able to be observed. The obtained sample was observed with a laser microscope (VK-9510 manufactured by KEYENCE CORPORATION), and the length of the observation image was measured by software attached to the apparatus. There was determined a linear distance (Ls) from one fold of a pair of adjacent folds to the other fold existing in a direction opposite to the one fold of a pair of the folds. Ls was determined from a total of 20 different adjacent folds, and the arithmetic average value was determined. Furthermore, Lr/Ls was determined from the arithmetic average value of Lr.

[Evaluation of Cavity Portion]

A sample was cut out from the fiber-reinforced composite material so that a cross section orthogonal to the extending direction of the cavity portion was an observation surface, and polishing was performed so that a pair of adjacent folds of the carbon fiber nonwoven fabric and a cross section of a continuous carbon fiber nonwoven fabric connecting a pair of the adjacent folds were able to be observed. The obtained sample was observed with a laser microscope (VK-9510 manufactured by KEYENCE CORPORATION) to observe the cross section of the cavity portion as a planar cross-sectional opening portion. The length was measured by software attached to the apparatus to determine the length of the maximum straight line that can be drawn in the cross-sectional opening portion. The length was measured for a total of 20 cross-sectional opening portions, and the arithmetic average value thereof was taken as the maximum length of the cross-sectional opening portion. each of adjacent cross-sectional opening portions were used and samples spaced 5 cm or more apart in the depth direction were prepared, and the measurement results thereof were used as the value used for the arithmetic average.

[Evaluation of In-Plane Orientation Portion and Out-of-Plane Orientation Portion]

An observation sample was produced by polishing so that a cross section parallel to the thickness direction of the fiber-reinforced composite material, that is, a cross section orthogonal to the extending direction of the cavity portion of the fiber-reinforced composite material was an observation surface. Cross-sectional observation of the fiber-reinforced structure portion was performed by using the observation sample, and the observation was performed by using a laser microscope (VK-9510 manufactured by KEYENCE CORPORATION). The arithmetic average value of the thickness was determined from a total of 10 points of the fiber-reinforced composite material observed in the cross section, and the cross section of the fiber-reinforced structure portion was divided into square grids each having a length of ⅕ of the arithmetic average value of the thickness as one side.

For each divided cross section, a reference line (0°) was assumed in the in-plane direction, attention was paid to individual reinforcing fibers intersecting the reference line, and a fiber orientation angle defined as an acute angle formed by the reference line and the reinforcing fibers was measured at a magnification of 400 times. When only the cross section of the reinforcing fibers (B) was exposed in the cross-sectional image, an ellipse inscribed in the cross section of the reinforcing fibers (B) was provided to obtain a fiber ellipse approximating the orientation direction of the reinforcing fibers (B), and for the reinforcing fibers (B) having an aspect ratio of 20 or more represented by major axis length/minor axis length of the fiber ellipse, the angle formed by the major axis direction of the fiber ellipse and the reference direction was determined as the fiber orientation angle of the reinforcing fibers (B). Fiber orientation angles of a total of 400 reinforcing fibers (B) were measured for each divided cross section, and the arithmetic average value thereof was determined as an average fiber orientation angle. By such a method, a divided cross section having an average fiber orientation angle of 0° or more and 45° or less was defined as the in-plane orientation portion, and a divided cross section having an average fiber orientation angle of more than 45° and 90° or less was defined as the out-of-plane orientation portion.

Then, the cross-sectional area of the in-plane orientation portion and the cross-sectional area of the out-of-plane orientation portion were determined from the observation image. The cross-sectional area ratio of the in-plane orientation portion was determined as a ratio (%) obtained by dividing the cross-sectional area of the in-plane orientation portion by the sum of the cross-sectional area of the in-plane orientation portion and the cross-sectional area of the out-of-plane orientation portion by 100, and the cross-sectional area ratio of the out-of-plane orientation portion was determined as a ratio (%) obtained by dividing the cross-sectional area of the out-of-plane orientation portion by the sum of the cross-sectional area of the in-plane orientation portion and the cross-sectional area of the out-of-plane orientation portion by 100. The ratio of the cross-sectional area of the out-of-plane orientation portion to the cross-sectional area of the in-plane orientation portion was determined by dividing the cross-sectional area of the out-of-plane orientation portion by the cross-sectional area of the in-plane orientation portion.

Furthermore, the arithmetic average value of the fiber orientation angles of the reinforcing fibers (B) in the in-plane orientation portions was recalculated, and this was taken as the average fiber orientation angle of the entire in-plane orientation portion. In addition, the arithmetic average value of the fiber orientation angles of the reinforcing fibers (B) in the out-of-plane orientation portions was recalculated, and this was taken as the average fiber orientation angle of the entire out-of-plane orientation portion.

[Evaluation of Average Pore Diameter]

Using Autopore IV9510 manufactured by Micromeritics Instrument Corporation as a mercury intrusion porosimeter, and the pore size was measured at a mercury intrusion pressure in the range of 4 kPa to 400 MPa. The average pore diameter was determined from the pore volume and the specific surface area obtained as a measurement result by the formula (1).

$$\text{(Average pore diameter)}=4\times\text{(pore volume)}/\text{(specific surface area)} \quad (1).$$

[Evaluation of Specific Gravity of Fiber-Reinforced Structure Portion]

The specific gravity of the fiber-reinforced structure portion is a value obtained by preparing a sample obtained by cutting out the fiber-reinforced structure portion from the fiber-reinforced composite material, dividing the sample mass [g] by the volume [cm$^3$] obtained from the outer periphery of the sample, and is obtained from the arithmetic average value of the specific gravities measured for five randomly extracted samples.

[Evaluation of Specific Gravity of Fiber-Reinforced Composite Material]

The specific gravity of the fiber-reinforced composite material can be determined as a value obtained by dividing the mass [g] of the fiber-reinforced composite material by the volume [cm³] determined from the outer periphery of the fiber-reinforced composite material.

[Evaluation of Number Average Fiber Length of Reinforcing Fiber (B)]

A sample was cut out from the fiber-reinforced composite material so as to have a mass of 2 g, and this sample was heated at 500° C. for 1 hour in an electric furnace to burn off the resin (A) and isolate the reinforcing fiber (B). The observation was performed with a laser microscope (VK-9510 manufactured by KEYENCE CORPORATION), the fiber lengths of a total of 400 reinforcing fibers (B) were measured with software attached to the apparatus, and the arithmetic average value thereof was determined as the number average fiber length of the reinforcing fiber (B).

[Evaluation of Deflection Under Load]

Using "Instron" (registered trademark) model 5565 universal material testing machine (manufactured by Instron Japan Co., Ltd.) as a testing machine, a sample was placed on a lower indenter having a square inner diameter of 100 mm on each side so as to cover the inner diameter, a load was gradually applied by a cylindrical upper indenter having a planar area of 10 mm² from immediately above an intersection of diagonals of the square inner diameter, and a value obtained by subtracting a displacement at a load of 0.1 N (at starting contact) from a displacement at a load of 50 N was defined as a deflection amount [mm], evaluation was performed in the following three stages, and good and fair were regarded as acceptable.

good: the deflection amount was 2 mm or less.
fair: the deflection amount is more than 2 mm and 3 mm or less.
bad: the deflection amount is larger than 3 mm.

Hereinafter, prepregs, fiber-reinforced composite materials, and sandwich structures produced in examples and comparative examples will be described.

Example 1

Figure 10:
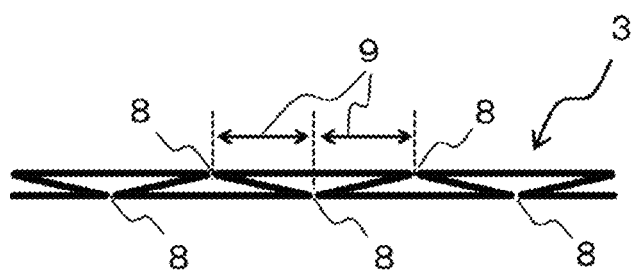
FIG. 10 is a schematic view showing a folded state of the reinforced fiber substrate (B') in the prepreg produced in Example 1.

A folded substrate having a basis weight of 100 g/cm² was prepared as the reinforced fiber substrate (B') by folding the carbon fiber nonwoven fabric produced as described above so as to have the cross-sectional structure shown in FIG. 10. In this case, when a prepreg was produced, at a pair of adjacent folds 8 of the reinforced fiber substrate (B'), folding was performed so that a linear distance (Lr) between a pair of the adjacent folds was 0 mm, that is, so as to be in contact with each other, and folding was performed so that a distance (Lf) between a pair of the adjacent folds connected along the carbon fiber nonwoven fabric was 10 mm and a linear distance (Ls) from one fold of a pair of the adjacent folds to the other fold in a direction opposite to a pair of the adjacent folds was 5 mm. Further, the folded substrate was folded so that a constituent ratio 9 of a pair of adjacent folds viewed from the front and back of the folded substrate was a symmetrical structure. That is, a pair of adjacent folds on one surface was disposed between a pair of adjacent folds and a pair of adjacent folds disposed adjacent thereto in the other surface, and the folding was repeated. Then, a PP resin film having a basis weight of 200 g/cm² as the resin (A) was laminated on the carbon fiber nonwoven fabric, and heat-pressed. In the heat-pressing step, the carbon fiber nonwoven fabric was impregnated with the PP resin by pressurization at a mold temperature of 180° C. and a pressure of 3 MPa for 10 minutes to provide a prepreg having a side of 200 mm.

In addition, one sheet of the obtained prepreg was thermally expanded for 10 minutes by using a press molding machine adjusted so as to have a mold surface temperature of 180° C. and a molded product thickness of 2.8 mm, thereby molding a fiber-reinforced composite material. The obtained fiber-reinforced composite material had an opening portion having a substantially triangular cross section surrounded by three sides of a fiber-reinforced structure portion as shown in FIG. 1. The opening portions of the cavity portions were aligned in the in-plane direction. The evaluation results are shown in Table 1.

Example 2

A prepreg and a fiber-reinforced composite material were obtained by performing processing in the same manner as in Example 1, except that the configuration of the folded substrate was changed so that Lr was 1 mm and Lf was 9 mm as the reinforced fiber substrate (B'). The obtained fiber-reinforced composite material had an opening portion having a substantially triangular cross section surrounded by three sides of a fiber-reinforced structure portion as shown in FIG. 1. The opening portions of the cavity portions were aligned in the in-plane direction. The evaluation results are shown in Table 1.

Example 3

Figure 13:
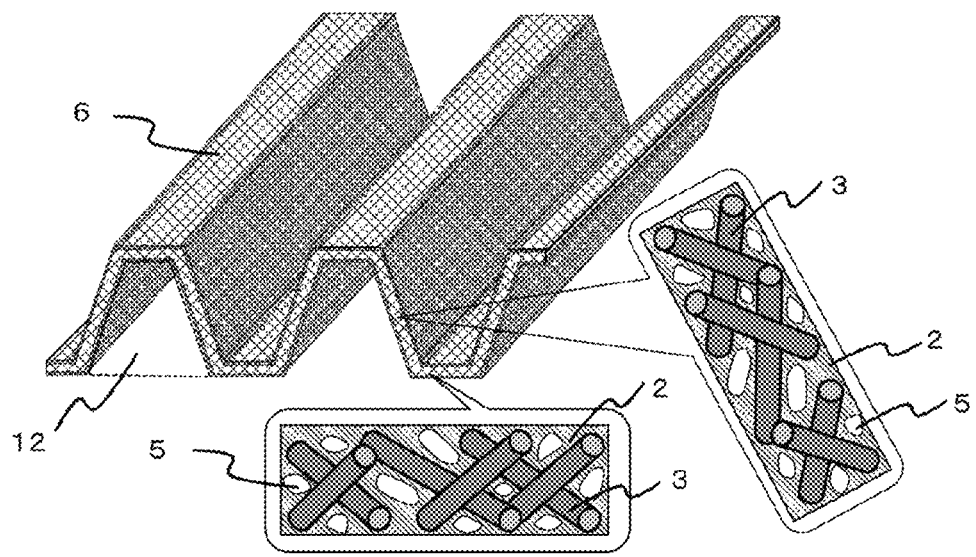
FIG. 13 is a schematic view showing one embodiment of the fiber-reinforced composite material of the present invention.

A prepreg and a fiber-reinforced composite material were obtained by performing processing in the same manner as in Example 1, except that the configuration of the folded substrate was changed so that Lr was 2 mm and Lf was 8 mm as the reinforced fiber substrate (B'). The obtained fiber-reinforced composite material had an opening portion having a substantially trapezoidal cross section constituting three sides of a fiber-reinforced structure portion as shown in FIG. 13. The opening portions of the cavity portions were aligned in the in-plane direction. The evaluation results are shown in Table 1.

Example 4

The same folded substrate as in Example 1 was used as the reinforced fiber substrate (B'), a PC resin film having a basis weight of 200 g/cm² was laminated as the resin (A), and heat-pressing was performed. In the heat-pressing step, the carbon fiber nonwoven fabric was impregnated with the PC resin by pressurization at a mold temperature of 240° C. and a pressure of 3 MPa for 10 minutes to provide a prepreg having a side of 200 mm. One sheet of the obtained prepreg was thermally expanded for 10 minutes by using a press molding machine adjusted so as to have a mold temperature of 240° C. and a molded product thickness of 2.2 mm, thereby molding a fiber-reinforced composite material. The obtained fiber-reinforced composite material had an opening portion having a substantially triangular cross section surrounded by three sides of a fiber-reinforced structure portion as shown in FIG. 1. The opening portions of the cavity portions were aligned in the in-plane direction. The evaluation results are shown in Table 1.

Example 5

Two sheets of the prepregs obtained in Example 1 were laminated to form a preform, and heating was performed for 10 minutes by using a press molding machine adjusted so as to have a mold temperature of 180° C. and a molded product thickness of 4.8 mm, thereby molding a fiber-reinforced composite material of a laminate. The obtained fiber-reinforced composite material had an opening portion having a substantially triangular cross section surrounded by three sides of a fiber-reinforced structure portion as shown in FIG. 1, and had a structure in which this was laminated in two layers. The opening portions of the cavity portions were aligned in the in-plane direction. The evaluation results are shown in Table 1.

Example 6

A prepreg and a fiber-reinforced composite material were obtained by performing processing in the same manner as in Example 1, except that the configuration of the folded substrate was changed so that Lr was 3 mm and Lf was 7 mm as the reinforced fiber substrate (B'). The obtained fiber-reinforced composite material had an opening portion having a substantially trapezoidal cross section constituting three sides of a fiber-reinforced structure portion as shown in FIG. 13. The opening portions of the cavity portions were aligned in the in-plane direction. The evaluation results are shown in Table 1.

Example 7

The fiber-reinforced composite material obtained in Example 1 was used for a core layer, the thermosetting prepreg produced as described above was disposed as a skin layer on the outer side thereof, and the lamination was performed so that the lamination configuration was [0°/90°/fiber-reinforced composite material/90°/0°], based on 0° of the orientation direction of the reinforcing fibers on one surface of the skin layer. Then, the thermosetting prepreg was cured by heat-pressing at a mold temperature of 150° C. and a pressure of 1 MPa for 10 minutes, thereby providing a sandwich structure. The thickness of the fiber-reinforced composite material in the obtained sandwich structure was 2.4 mm, no crush occurred during formation of the sandwich structure, and thus the core layer was able to be well used.

Example 8

The fiber-reinforced composite material obtained in Example 5 was used for a core layer, the thermosetting prepreg was disposed as a skin layer on the outer side thereof, and the lamination was performed so that the lamination configuration was [0°/90°/fiber-reinforced composite material/90°/0°], based on 0° of the orientation direction of the reinforcing fibers on one surface of the skin layer. Then, the thermosetting prepreg was cured by heat-pressing at a mold temperature of 150° C. and a pressure of 1 MPa for 10 minutes, thereby providing a sandwich structure. The thickness of the laminate in the obtained sandwich structure was 4.3 mm, no crush occurred during formation of the sandwich structure, and thus the core layer was able to be well used.

Comparative Example 1

Figure 11:
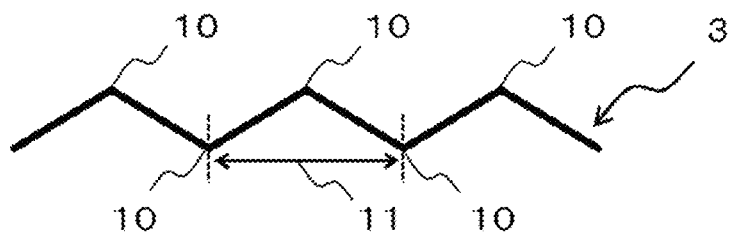
FIG. 11 is a schematic view showing a folded state of the reinforced fiber substrate (B') in the prepreg produced in Comparative Example 1.
Figure 14:
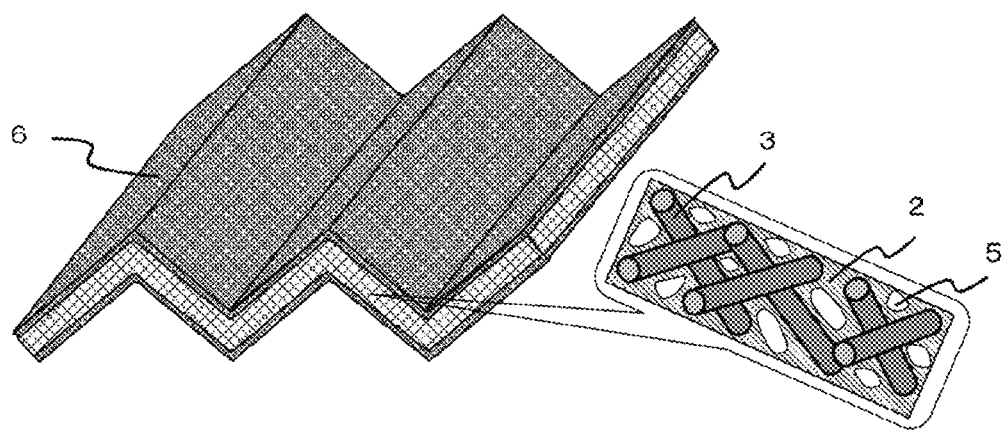
FIG. 14 is a schematic view showing one embodiment of the fiber-reinforced composite materials produced in Comparative Examples 1 and 3.

A substrate having a basis weight of 100 g/cm² was prepared by folding a carbon fiber nonwoven fabric so as to have a cross-sectional structure having an apex 10 of a zigzag structure as shown in FIG. 11. In this case, folds were formed so that a repetition interval 11 between the apexes of the zigzag structure was 5 mm at equal intervals. Then, a PP resin film having a basis weight of 200 g/cm² was laminated on the substrate, and heat-pressed. In the heat-pressing step, the above substrate was impregnated with the PP resin by pressurization at a mold temperature of 180° C. and a pressure of 3 MPa for 10 minutes to provide a prepreg having a side of 200 mm. One sheet of the obtained prepreg was thermally expanded for 10 minutes by using a press molding machine adjusted so as to have a mold temperature of 180° C. and a molded product thickness of 2.8 mm, thereby molding a fiber-reinforced composite material. In the obtained fiber-reinforced composite material, the cross section of the fiber-reinforced structure portion 6 had a zigzag structure as shown in FIG. 14. The evaluation results are shown in Table 1.

Comparative Example 2

A PP resin film having a basis weight of 200 g/cm² was laminated on a flat carbon fiber nonwoven fabric having no fold and 100 g/cm², and heat-pressed. In the heat-pressing step, the above substrate was impregnated with the PP resin by pressurization at a mold temperature of 180° C. and a pressure of 3 MPa for 10 minutes to provide a prepreg having a side of 200 mm. One sheet of the obtained prepreg was thermally expanded for 10 minutes by using a press molding machine adjusted so as to have a mold temperature of 180° C., thereby molding a fiber-reinforced composite material. The distance between the upper mold and the lower mold of the mold was set to 2.8 mm, and the molding was performed for the purpose of having a mold product thickness of 2.8 mm; however, the prepreg did not expand to the thickness between the upper mold and the lower mold of the mold, a cavity portion was not formed in the obtained fiber-reinforced composite material, and the thickness remained at 0.9 mm. The evaluation results are shown in Table 1.

Comparative Example 3

A prepreg and a fiber-reinforced composite material were obtained by performing processing in the same manner as in Example 1, except that the configuration of the folded substrate was changed so that Lr was 4 mm and Lf was 6 mm as the reinforced fiber substrate (B'). In the obtained fiber-reinforced composite material, the cross section of the fiber-reinforced structure portion had a zigzag structure as shown in FIG. 14. The evaluation results are shown in Table 1.

Comparative Example 4

The fiber-reinforced composite material obtained in Comparative Example 1 was used for a core layer, the thermosetting prepreg was disposed as a skin layer on the outer side thereof, and the lamination was performed so that the lamination configuration of the thermosetting prepreg was [0°/90°/fiber-reinforced composite material/90°/0°], based on 0° of the orientation direction of the reinforcing fibers on one surface of the skin layer. Then, the thermosetting prepreg was cured by heat-pressing at a mold temperature of 150° C. and a pressure of 1 MPa for 10 minutes, thereby providing a sandwich structure. The thickness of the fiber-reinforced composite material in the obtained sandwich structure was 0.6 mm, and crushing occurred by the molding pressure for forming the sandwich structure, and the use as a core layer was impossible.

TABLE 1

|  |  | Example 1 | Example 2 | Example 3 | Example 4 | Example 5 | Comparative Example 1 | Comparative Example 2 | Example 6 | Comparative Example 3 |
|---|---|---|---|---|---|---|---|---|---|---|
| Cross-sectional area ratio of in-plane orientation portion | % | 57 | 59 | 69 | 63 | 39 | 100 | 100 | 50 | 100 |
| Cross-sectional area ratio of out-of-plane orientation portion | % | 43 | 41 | 31 | 37 | 61 | 0 | 0 | 50 | 0 |
| Cross-sectional area ratio of out-of-plane orientation portion to in-plane orientation portion | times | 0.75 | 0.69 | 0.45 | 0.59 | 1.6 | 0 | 0 | 1 | 0 |
| Average fiber orientation angle of in-plane orientation portion | ° | 8 | 10 | 14 | 5 | 5 | 34 | 0 | 12 | 31 |
| Average fiber orientation angle of out-of-plane orientation portion | ° | 60 | 71 | 86 | 48 | 52 | — | — | 71 | — |
| Maximum length of cross-sectional opening portion | μm | 4200 | 3600 | 3100 | 4500 | 4400 | 5000 | — | 5000 | 8000 |
| Average pore diameter | μm | 58 | 58 | 58 | 60 | 52 | 63 | 70 | 58 | 58 |
| Specific gravity of fiber-reinforced structure portion | g/cm$^3$ | 0.4 | 0.4 | 0.4 | 0.5 | 0.4 | 0.4 | 0.4 | 0.4 | 0.4 |
| Specific gravity of fiber-reinforced composite material | g/cm$^3$ | 0.1 | 0.1 | 0.1 | 0.1 | 0.1 | 0.1 | 0.4 | 0.1 | 0.1 |
| Fold angle | ° | 5 | 6 | 8 | 5 | 5 | 110 | — | 8 | 8 |
| Lr | mm | 0 | 1 | 2 | 0 | 0 | 5 | — | 3 | 4 |
| Lf | mm | 10 | 9 | 8 | 10 | 10 | 6 | — | 7 | 6 |
| Lr/Lf | — | 0 | 0.11 | 0.25 | 0 | 0 | 0.83 | — | 0.43 | 0.67 |
| Ls | mm | 5 | 5 | 5 | 5 | 5 | 5 | — | 5 | 5 |
| Lr/Ls | — | 0 | 0.2 | 0.4 | 0 | 0 | 1.0 | — | 0.6 | 0.8 |
| Resin (A) | — | PR | PP | PP | PC | PP | PP | PP | PP | PP |
| Content of reinforcing fiber (B) | parts by mass | 50 | 50 | 50 | 50 | 50 | 50 | 50 | 50 | 50 |
| Number average fiber length of reinforcing fiber (B) | mm | 6 | 6 | 6 | 6 | 6 | 6 | 6 | 6 | 6 |
| Thickness of fiber-reinforced composite material | mm | 2.8 | 2.8 | 2.8 | 2.2 | 4.8 | 2.8 | 0.9 | 2.8 | 2.8 |
| Deflection under load | — | good | good | fair | good | good | bad | bad | fair | bad |

The fiber-reinforced composite material of the present invention can be preferably applied to applications such as aircraft structural members, wind turbine blades, automobile structural members, IC trays, and housings of notebook computers.

DESCRIPTION OF REFERENCE SIGNS

1: Prepreg
2: Resin (A)
3: Reinforcing fiber (B) or reinforced fiber substrate (B')
31: Fold of reinforcing fiber (B) or fold of reinforced fiber substrate (B')
31A: Fold of reinforced fiber substrate (B') (first fold)
31B: Fold of reinforced fiber substrate (B') (second fold)
31C: Fold of reinforced fiber substrate (B') (third fold)
31D: Fold of reinforced fiber substrate (B') (fourth fold)
31E: Fold of reinforced fiber substrate (B') (the other second fold)
Lr: Distance between first fold and mostly adjacent fold (fourth fold)
Lf: Distance between first fold and fold (fourth fold) mostly adjacent to first fold along reinforced fiber substrate (B')
Ls: Linear distance from one fold of a pair of adjacent folds to the other fold existing in a direction opposite to the one fold of a pair of the folds.
θ: Fold angle
4: Space having substantially triangular cross section (cavity portion)
5: Microporous
6: Fiber-reinforced structure portion
6A: Divided cross section of fiber-reinforced structure portion
7: Thickness of fiber-reinforced composite material
8: A pair of adjacent folds of reinforced fiber substrate (B')
9: Constituent ratio of a pair of adjacent folds viewed from front and back surfaces of folded substrate
10: Apex of zigzag structure
11: Repeat spacing between apexes of zigzag structure
12: Space having substantially trapezoidal cross section (cavity portion)

The invention claimed is:

1. A The fiber-reinforced composite material comprising:
a resin (A), wherein the resin (A) is a thermoplastic resin; and
a reinforcing fiber (B), wherein the reinforcing fiber (B) is a discontinuous fiber having a number average fiber length of 1 mm or more and 50 mm or less, and including:
a fiber-reinforced structure portion including an in-plane orientation portion having an average fiber orientation angle of the reinforcing fiber (B) of 0° or more and 45° or less and an out-of-plane orientation portion having an average fiber orientation angle of the reinforcing fiber (B) of more than 45° and 90° or less; and
a tunnel-shaped cavity portion defined by the in-plane orientation portion and the out-of-plane orientation portion of the fiber-reinforced structure portion,
wherein the tunnel-shaped cavity portion extends in an in-plane direction of the fiber reinforced composite material, and
wherein the in-plane direction is orthogonal to a thickness direction of the fiber reinforced composite material.

2. The fiber-reinforced composite material according to claim 1, wherein in a cross section orthogonal to an extending direction of the tunnel-shaped cavity portion, a cross-sectional area of an out-of-plane orientation portion with respect to a cross-sectional area of an in-plane orientation portion is 0.5 times or more and 10 times or less.

3. The fiber-reinforced composite material according to claim 1, wherein the tunnel-shaped cavity portion is defined by an in-plane orientation portion having an average fiber orientation angle of 0° or more and 30° or less and an out-of-plane orientation portion having an average fiber orientation angle of 60° or more and 90° or less.

4. The fiber-reinforced composite material according to claim 1, wherein the thermoplastic resin is at least one thermoplastic resin selected from the group consisting of polyolefin, polycarbonate, polyester, polyarylene sulfide, polyamide, polyoxymethylene, polyetherimide, polyethersulfone, and polyarylene ether ketone.

5. The fiber-reinforced composite material according to claim 1, wherein reinforcing fibers (B) are randomly dispersed in the fiber-reinforced structure portion.

6. The fiber-reinforced composite material according to claim 1, wherein a reinforcing fiber (B) is carbon fiber.

7. The fiber-reinforced composite material according to claim 1, wherein the fiber-reinforced structure portion has micropores with an average pore diameter of 500 μm or less.

8. The fiber-reinforced composite material according to claim 1, wherein a specific gravity of the fiber-reinforced structure portion is 0.3 g/cm³ or more and 0.8 g/cm³ or less.

9. The fiber-reinforced composite material according to claim 1, wherein an average value of maximum lengths of cross-sectional opening portion of the tunnel-shaped cavity portion is 1000 μm or more and 10000 μm or less.

10. The fiber-reinforced composite material according to claim 1, wherein a specific gravity of the fiber-reinforced composite material is 0.001 g/cm³ or more and 0.2 g/cm³ or less.

11. The fiber-reinforced composite material according to claim 1, wherein a thickness of the entire fiber-reinforced composite material is 0.1 mm or more and 5 mm or less.

12. The fiber-reinforced composite material according to claim 1, comprising a laminated structure formed by laminating a plurality of layers in which opening portions of tunnel-shaped cavity portions are aligned in an in-plane direction in a cross section orthogonal to an extending direction of the tunnel-shaped cavity portion.

13. A sandwich structure comprising a skin layer disposed on both surfaces of the fiber-reinforced composite material according to claim 1.

14. The sandwich structure according to claim 13, wherein the skin layer has a structure in which a fiber-reinforced resin layer with reinforcing fibers arranged in one direction is laminated in a plurality of layers while changing a lamination angle, that is, while changing an arrangement direction of the reinforcing fibers in each layer.

15. The fiber-reinforced composite material according to claim 1, wherein the tunnel-shaped cavity portion is defined by an out-of-plane orientation portion having an average fiber orientation angle of 75° or more and 90° or less.

16. The fiber-reinforced composite material according to claim 7, wherein the average pore diameter is 10 μm or more and 150 μm or less.

17. The fiber-reinforced composite material according to claim 1, wherein the fiber-reinforced composite material is molded by using a folded prepreg of resin-impregnated sheet-shaped reinforcing fiber.

18. The fiber-reinforced composite material according to claim 17, wherein the tunnel-shaped cavity portion extends in an in-plane direction of the folded prepreg.

19. The fiber-reinforced composite material according to claim 1, wherein the reinforcing fiber (B) is a reinforced fiber substrate (B') and the reinforced fiber substrate (B') has a folded structure including a substantially triangular structure formed in such a manner that a first fold is adjacent to one of fourth folds when a certain fold is the first fold in the cross section, wherein two folds adjacent to both sides of the first fold are a second fold, two folds further adjacent to the outside of the second fold are a third fold, and two folds further adjacent to the outside of the third fold are the fourth fold.

20. The fiber-reinforced composite material according to claim 1, wherein the cavity portion has a structure in which a pair of adjacent folds of the reinforcing fibers (B) are bonded to each other by the resin (A).

* * * * *

UNITED STATES PATENT AND TRADEMARK OFFICE
CERTIFICATE OF CORRECTION

| | |
|---|---|
| PATENT NO. | : 12,076,943 B2 |
| APPLICATION NO. | : 17/778073 |
| DATED | : September 3, 2024 |
| INVENTOR(S) | : Naokichi Imai, Kotaro Shinohara and Masato Honma |

It is certified that error appears in the above-identified patent and that said Letters Patent is hereby corrected as shown below:

In the Specification

In Column 23-24, Line 29, Example 1 of TABLE 1: "PR" should be -- PP --.

In the Claims

In Column 24, Line 47, Claim 1: "A The" should be -- A --.

Signed and Sealed this
Third Day of December, 2024

Katherine Kelly Vidal
*Director of the United States Patent and Trademark Office*